Patented Feb. 18, 1941

2,232,241

UNITED STATES PATENT OFFICE 2,232,241

METHOD OF PRODUCING AMMONIUM SULPHAMATE

Louis C. Jones, Greenwich, Conn., assignor to American Cyanamid Company, New York, N. Y., a corporation of Maine No Drawing. Application December 9, 1939, Serial No. 308,428

3 Claims. (Cl. 23—114)

The present invention relates to a method of producing ammonium sulphamate.

It has heretofore been proposed to produce sulphamic acid by reacting dry ammonia with dry $SO_3$ in the gas phase or by treatment of urea with fuming sulphuric acid or by treatment of urea with chlorsulphonic acid.

These processes offer the difficulties that they are costly by reason of the large apparatus necessary to handle gases and moreover, under such conditions, recovery of the desired product from the walls of the reaction vessel is difficult.

The present invention has as its principal object a simple method of arriving at ammonium sulphamate from which sulphamic acid may be readily prepared.

The object of the invention may be easily accomplished by reacting sodium chlorsulphonate or other alkali chlorsulphonates with liquid ammonia. Under these circumstances, no extreme operating difficulties are presented due to the fact that the reactants are present as solids or liquids and the reaction product is easily recovered by the simple evaporation of excess liquid ammonia.

In the preferred form, a quantity of sodium chlorsulphonate is introduced into the vessel containing a quantity of liquid ammonia in sufficient excess to take up the exothermic heat of reaction. As a result of the reaction, there is formed ammonium sulphamate which goes into solution in the excess liquid ammonia and sodium chloride which, being only slightly soluble therein, is precipitated. Upon filtering the contents of the reaction vessel, the sodium chloride remains as a filter cake and ammonium sulphamate may be recovered from the filtrate by the evaporation of excess ammonia. The sulphamate thus recovered may be separated from the small amount of sodium chloride occurring therein by recrystallization from liquid ammonia or other desired means. However, this is not absolutely necessary inasmuch as the sodium chloride is present in the recovered sulphamate in such small quantities that if the free sulphamic acid is desired and made by introduction of the salt into sulphuric acid, the small amount of sodium chloride is converted into sodium bisulphate, which is soluble in sulphuric acid while the sulphamic acid itself is precipitated. The latter may be readily separated from the liquid menstruum within which it is contained by filtration.

While the reaction may be advantageously carried out at the boiling point of ammonia in open vessels, yet where a recovery system is desired for the gaseous ammonia, pressure may be utilized as this does not in any way change the nature of the reaction.

While in the preferred form sodium chlorsulphonate has been mentioned as one of the reactants, yet obviously other alkali chlorsulphonates may be used similarly, although at higher cost.

It is, of course, desirable that the reactants be substantially anhydrous as otherwise alkali sulphate will be formed. A small amount of this contaminant is not detrimental, however, inasmuch as it is not soluble in liquid ammonia and, consequently, it will appear on the filter cake with the alkali chloride.

Example I 5 grams of sodium chlorsulphonate (available $SO_3$ 58.5%) was added to 40 cc. of liquid ammonia. The solution was filtered from the insoluble residue, the ammonia evaporated from the filtrate and the recovered solids heated for two hours in dilute water solution. The solution was concentrated to a small volume, cooled to a crystallizing temperature and ammonium sulphamate crystals recovered therefrom.

Example II

A portion of the liquor from Example I prior to cooling and crystallization was treated with enough sulphuric acid to give a 60% solution. Upon cooling crystals separated which were removed from the solution and washed with alcohol. These crystals had a melting point of 206° C. and an acid value corresponding to that of sulphamic acid.

Example III 49 grams of sodium chlorsulphonate (available $SO_3$ 58.5%) were added in very small portions to 200 cc. of liquid ammonia in an insulated flask. The addition of the salt caused rapid boiling of the ammonia so that mechanical agitation was unnecessary. The ammonia was in the form of a rather viscous solution with a small amount of solids at the bottom of the flask after all the salt had been added. The loss of ammonia during this run amounted to 67 grams, which was replaced with more liquid, causing additional solids to precipitate. The solution was filtered on a fritted glass funnel and the filter cake washed with liquid ammonia. Evaporation of the filtrate gave 31 grams of solids. 5 grams of this product were dissolved in 10 cc. of water and added to 90 grams of 70% sulphuric acid. A 10 gram sample of this solution was heated in 100 cc. of water on a steam plate for four hours and concentrated until crystals separated on cooling. These were then taken up with 70% sulphuric acid, the solution concentrated, cooled and sulphamic acid crystallized therefrom.

*Example IV*

5 grams of the solids obtained by evaporation of the ammonia from the initial filtrate were stirred with 60 cc. of 63% sulphuric acid to see if sulphamic acid could be separated without first dissolving the product in water. After mixing for about ten minutes, the sample was filtered on a fritted glass funnel and washed free of acid with alcohol. 1.6 grams of sulphamic acid analyzing 97% by titration were obtained.

*Example V*

80 grams of finely ground sodium chlorsulphonate were added to 400 cc. of liquid ammonia in an insulated beaker with a close-fitting cover. The addition of the salt was made to give a scattering effect over the surface of the ammonia so that the reaction would take place with individual particles of the salt. The residue from the reaction was filtered and washed with ammonia and the ammonia filtrate and washings evaporated to dryness. This residue was allowed to remain in a desiccator over sulphuric acid for 18 hours. A sample treated with 65% sulphuric acid gave a recovery of sulphamic acid equivalent to 38% of the weight of the sample having an acid value corresponding to a purity of 97%.

*Example VI*

In order to get rid of some insoluble matter which contaminated the sulfamic acid, a 20 gram sample of the solid resulting from the initial reaction in the last example was dissolved in water and filtered. It was concentrated until saturated when cold, and mixed with sufficient 80% sulphuric acid at 10° C. to give a 65% solution of the latter. The sulphamic acid, after being allowed to crystallize was filtered and washed with alcohol. 7.2 grams of sulphamic acid were obtained. A qualitative test showed the presence of no ammonium ions. It contains 14.26% nitrogen as against a theoretical value of 14.41%. This represented a purity of 98.7%. The acid value corresponded to a purity of 98.9%.

*Example VII*

50 grams of sodium chlorsulphonate ground to pass 80 mesh were added to 200 cc. of liquid ammonia. After the reaction was completed, the ammonia was evaporated without filtering. 10 grams of the thus obtained residue were dissolved in 11 cc. of water and 14 cc. of 65% sulphuric acid and then 28 grams of 96% sulphuric acid were added to the solution to precipitate the sulphamic acid. The slurry was allowed to stand for one hour at 20° C., it was filtered on a fritted glass funnel and the sulphamic acid washed with alcohol. 3.2 grams of sulphamic acid having a purity of 97.8% by alkali titration were obtained. On a basis that the sodium chlorsulphonate contained 58.5% $SO_3$, the yield of sulphamic acid based upon the $SO_3$ content of the sodium chlorsulphonate was 49%.

While the invention has been described with particular reference to specific embodiments, it is to be understood that it is not to be limited thereto but is to be construed broadly and restricted solely by the scope of the appended claims.

I claim:

1. A method of making ammonium sulphamate which comprises reacting alkali chlorsulphonate with liquid ammonia, separating the solid reaction product from the liquid and recovering ammonium sulphamate from the latter.

2. The method of claim 1 in which the chlorsulphonate is that of sodium.

3. The method of claim 1 with the additional step of separating the ammonium sulphamate from the residual alkali chloride by recrystallization in liquid ammonia.

LOUIS C. JONES.